(12) United States Patent
Zoucha

(10) Patent No.: US 8,916,803 B1
(45) Date of Patent: Dec. 23, 2014

(54) APPARATUS FOR COOKING OR HEATING FOOD OR LIQUIDS

(71) Applicant: James Zoucha, Orchard, NE (US)

(72) Inventor: James Zoucha, Orchard, NE (US)

( * ) Notice: Subject to any disclaimer, the term of this patent is extended or adjusted under 35 U.S.C. 154(b) by 157 days.

(21) Appl. No.: 13/761,732

(22) Filed: Feb. 7, 2013

Related U.S. Application Data

(63) Continuation-in-part of application No. 13/731,368, filed on Dec. 31, 2012, which is a continuation-in-part of application No. 13/532,153, filed on Jun. 25, 2012, now Pat. No. 8,816,254.

(51) Int. Cl.
*A47K 1/04* (2006.01)
*F27B 5/14* (2006.01)
*A21B 1/22* (2006.01)
*F24C 15/08* (2006.01)
*F16M 13/02* (2006.01)

(52) U.S. Cl.
CPC ..................... *F16M 13/02* (2013.01)
USPC ........... 219/411; 219/429; 219/430; 219/432; 219/450.1; 219/451.1; 219/452.11; 219/452.12; 219/453.11; 219/453.12; 126/201; 126/50; 126/40; 126/42; 126/39 B; 126/55; 126/39 C; 126/9 B; 126/30; 126/9 R; 248/205.1; 248/220.21; 248/150; 248/235; 248/250; 248/129; 211/186

(58) Field of Classification Search
CPC .............. A21B 1/22; A21B 1/48; A21B 2/00; F23H 3/00; F23H 3/006; F23H 9/00; F23H 9/0094; F23H 9/20; F23H 9/2085; F24C 3/065; F24C 3/067; F24C 7/043; F24C 7/046; F16M 11/42

USPC ......... 248/205.1, 129, 214, 220.21, 150, 235, 248/250; 219/411, 429, 430, 432, 450.1, 219/452.11, 452.12, 453.11, 453.12; 126/201, 50, 40, 42, 39 B, 55, 39 C, 30, 126/9 R, 9 B; 211/186
See application file for complete search history.

(56) References Cited

U.S. PATENT DOCUMENTS

| | | | | |
|---|---|---|---|---|
| 4,089,258 A * | 5/1978 | Berger | | 99/339 |
| 4,421,015 A * | 12/1983 | Masters et al. | | 99/332 |
| 4,984,515 A * | 1/1991 | Pivonka | | 99/449 |
| 5,027,788 A * | 7/1991 | Schlosser et al. | | 126/25 R |
| 6,276,356 B1 * | 8/2001 | Ragland et al. | | 126/41 R |
| 6,732,637 B2 * | 5/2004 | Artt | | 99/476 |
| 2004/0244790 A1 * | 12/2004 | McKenzie et al. | | 126/41 R |
| 2011/0204014 A1 * | 8/2011 | Miller et al. | | 211/90.01 |

* cited by examiner

*Primary Examiner* — Christopher Garft
(74) *Attorney, Agent, or Firm* — Dennis L. Thomte; Thomte Patent Law Office LLC

(57) ABSTRACT

The apparatus of this invention relates to a device for heating or cooking food or liquids such as soup, water, roast, etc. A downwardly curved visor-like deflector is selectively removably positioned outwardly of the upper end of the radiation disk of an infrared heater so as to extend outwardly therefrom. The deflector has an upwardly presented cooking utensil opening formed therein and a horizontally disposed cooking utensil support secured to the deflector at the inner surface thereof below the cooking utensil opening. The cooking utensil support dwells in a plane below the upper end of the radiation disk whereby infrared rays emitted from the radiation disk will impinge upon the cooking utensil support and a cooking utensil positioned on the cooking utensil support to cook or heat the contents thereof. Other accessories may also be attached to the heater such as a protective grill or a cooking basket.

10 Claims, 5 Drawing Sheets

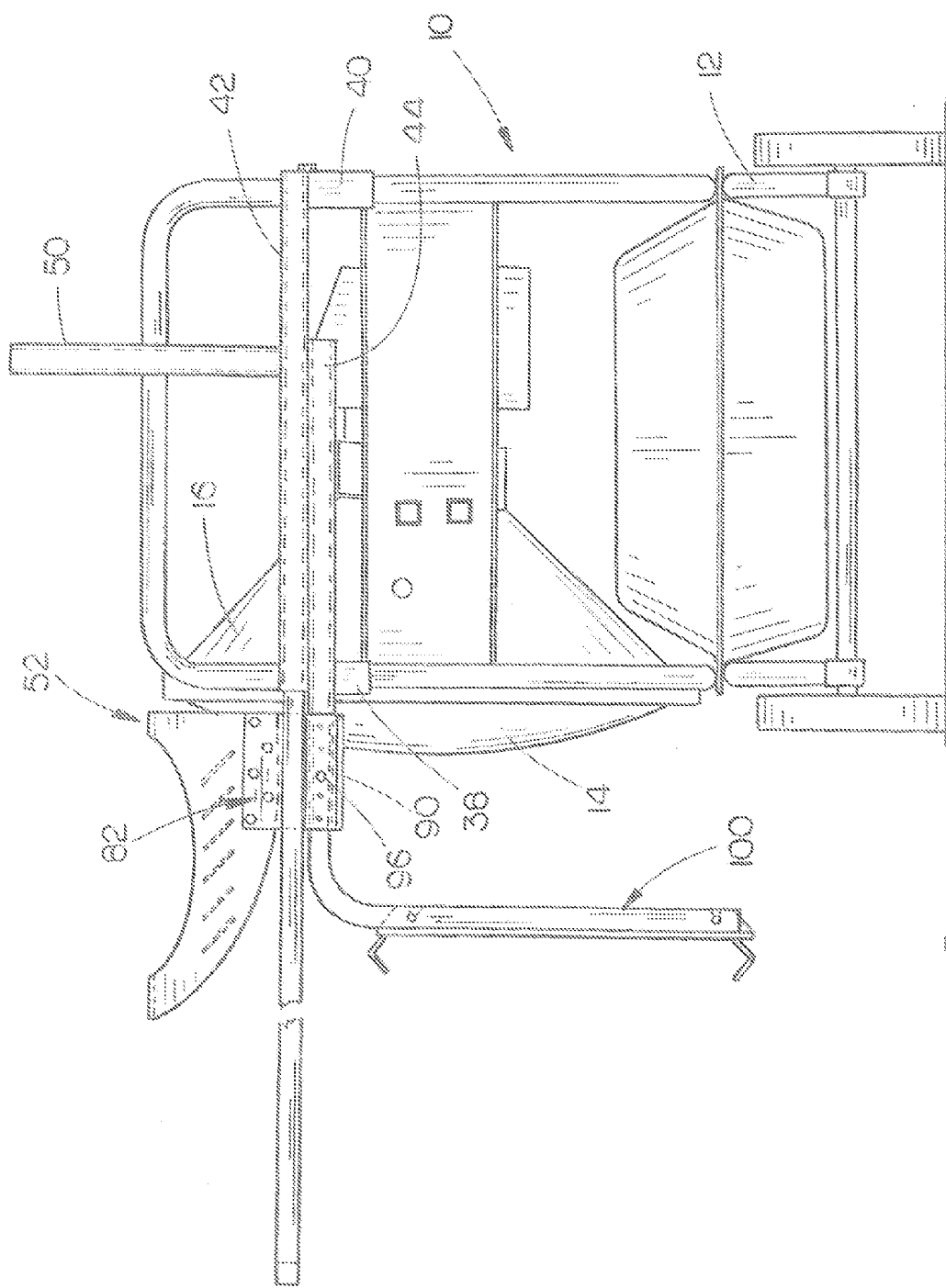

APPARATUS FOR COOKING OR HEATING FOOD OR LIQUIDS

CROSS REFERENCE TO RELATED APPLICATION

This is a Continuation-In-Part Application of Ser. No. 13/731,368 filed Dec. 31, 2012, entitled APPARATUS FOR COOKING OR HEATING FOOD OR LIQUIDS; which is a Continuation-In-Part Application of Ser. No. 13/532,153, filed Jun. 25, 2012 entitled APPARATUS FOR COOKING OR HEATING FOOD OR LIQUIDS.

BACKGROUND OF THE INVENTION

1. Field of the Invention

This invention relates to an apparatus for heating liquids such as soup, water, etc. The invention may also be used to cook or heat food such as a roast, etc. Even more particularly, the apparatus of this invention includes an infrared heater visor-like deflector selectively secured to the frame of the heater so as to be positioned at the upper discharge end of the radiation disk of the infrared heater with the visor or deflector having a utensil support provided thereon for supporting pots, kettles, etc. Further, the structure for mounting the deflector on the heater also enables other accessories to be selectively removably secured to the heater.

2. Description of the Related Art

Many attempts have been previously provided for cooking foods by way of radiant heat. For example, see U.S. Pat. Nos. 4,089,258; 4,421,015; 6,276,356; and 6,732,637. Although the devices of the prior art may cook food with radiant heat, the prior art devices seem to be very complicated and expensive. Further, it is not believed that the prior art methods of cooking foods are convenient to use and perhaps do not perform the cooking operation in a satisfactory manner. Further, the prior art devices do not provide an attachment which may be connected to and supported by a conventional infrared radiant heater such as those infrared radiant heaters of the Val6 Series manufactured by Shizouka Seika Co., Ltd., having an address of 4-1 Yamana, Fukuroi-shi, Shizouka-ken, Japan 437-8601.

In the co-pending application Ser. No. 13/532,153, filed Jun. 25, 2012, an apparatus is disclosed for cooking or heating food or liquids. In that application, the visor-like deflector was attached directly to the radiation disk. The direct attachment of the deflector to the radiation disk in the co-pending application works very well but could possibly raise a warranty issue with respect to the heater.

In the co-pending application Ser. No. 13/731,368, filed Dec. 31, 2012, Applicant provided a mounting structure for attaching the visor-like deflector to the frame of the infrared heater with the mounting structure enabling other accessories to be selectively removably secured to the heater.

In an earlier patent application of Applicant, Ser. No. 13/494,123, filed Jun. 12, 2012, entitled APPARATUS FOR COOKING FOOD, an improved apparatus was disclosed for cooking food such as meat, seafood, chicken, etc. The inventions of the co-pending applications provided additional ways of cooking or heating food or liquids. The instant invention is a further improvement in the cooking or heating art through the use of an infrared heater.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

An apparatus is disclosed for heating or cooking food or for heating liquids such as soup or water. The apparatus is designed to be used with an infrared radiant heater having a radiation disk at the discharge end thereof from which infrared rays are emitted therefrom. The infrared heater includes a frame which is preferably supported by wheels. The heater could also be of the non-wheeled type.

A first mounting bracket is secured to the heater frame at one side thereof. A second mounting bracket is secured to the heater frame at another side thereof. The first mounting bracket includes a first elongated and horizontally disposed tubular member, having forward and rearward ends, secured to the heater frame. A second elongated and horizontally disposed tubular member, having forward and rearward ends, is secured to the first tubular member of the first mounting bracket at the lower side thereof. The forward end of the second tubular member of the first mounting bracket extends forwardly (outwardly) beyond the forward end of the first tubular member of the first mounting bracket to provide a forward end portion thereof. The vertically disposed tubular member extends upwardly from the first tubular member of the first mounting bracket. The second mounting bracket includes a first elongated and horizontally disposed tubular support member secured to the heater frame. A second elongated and horizontally disposed tubular member is secured to the first tubular member of the second mounting bracket at the lower side thereof. The forward end of the second tubular member of the second mounting bracket extends forwardly (outwardly) beyond the forward end of the first tubular member of the second mounting bracket to provide a forward end portion thereof. A vertically disposed tubular member extends upwardly from the first tubular member of the second mounting bracket.

The apparatus of this invention also includes a downwardly curved metal visor or visor-like deflector. The deflector includes a central portion and side portions. The deflector also has inner and outer surfaces. A cooking utensil opening is formed in the deflector 52 and also includes a cooking utensil support positioned below the cooking utensil opening.

A first bracket is secured to one side of the deflector and extends outwardly therefrom. A horizontally disposed, hollow tube is secured to the outer end of the first bracket. A second bracket is secured to the second side of the deflector and has a horizontally disposed, hollow tube secured to the outer end thereof.

The deflector is selectively removably mounted on the heater by slidably slipping the first and second tubes of the first and second brackets onto the forward end portions of the second and fourth tubular members of the first and second mounting brackets respectively. The deflector may be selectively horizontally adjusted with respect to the radiation disk of the heater.

The structure for mounting the deflector to the heater also enables a wire grill basket supporting structure to be operatively mounted on the heater. The supporting structure for the deflector includes horizontally spaced-apart frame members, each of which has a horizontally disposed frame portion and a vertically disposed frame portion. The horizontally disposed frame portions of the structure for mounting the deflector may be slidably received by the open forward ends of the second and third tubular members of the first and second mounting brackets respectively. A cooking basket may be selectively secured to the grill basket structure.

A protective grill is also provided having horizontally disposed end portions with those end portions being adapted to be selectively slidably received by the forward open ends of the first and third tubular members. When the protective grill member is to be stored or not being used, the first and second end portions thereof may be inserted into the vertically disposed tubular members which extend upwardly from the first and third tubular members respectively.

It is therefore a principal object of the invention to provide an improved apparatus for cooking or heating food or liquids.

A further object of the invention is to provide a visor-like deflector which is selectively removably positioned outwardly of the upper end of the radiation disk of an infrared heater with the deflector having a cooking utensil opening formed therein and a cooking utensil support secured to the underside of the deflector below the cooking utensil opening.

A further object of the invention is to provide an apparatus of the type described which ensures that the food or liquids being cooked or heated will be quickly and easily heated or cooked with a minimum amount of time.

A further object of the invention is to provide an apparatus for heating or cooking food or liquids which is easily secured to a conventional infrared heater at the discharge side thereof above the radiation disk of the heater.

A further object of the invention is to provide mounting bracketry which enables other accessories to be secured to the heater.

A further is to provide an apparatus for cooking or heating food or liquids which is economical of manufacture, durable in use and refined in appearance.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 5 is a side elevational view of the infrared heater having various accessories mounted thereon.

DESCRIPTION OF THE PREFERRED EMBODIMENT

Figure 1:
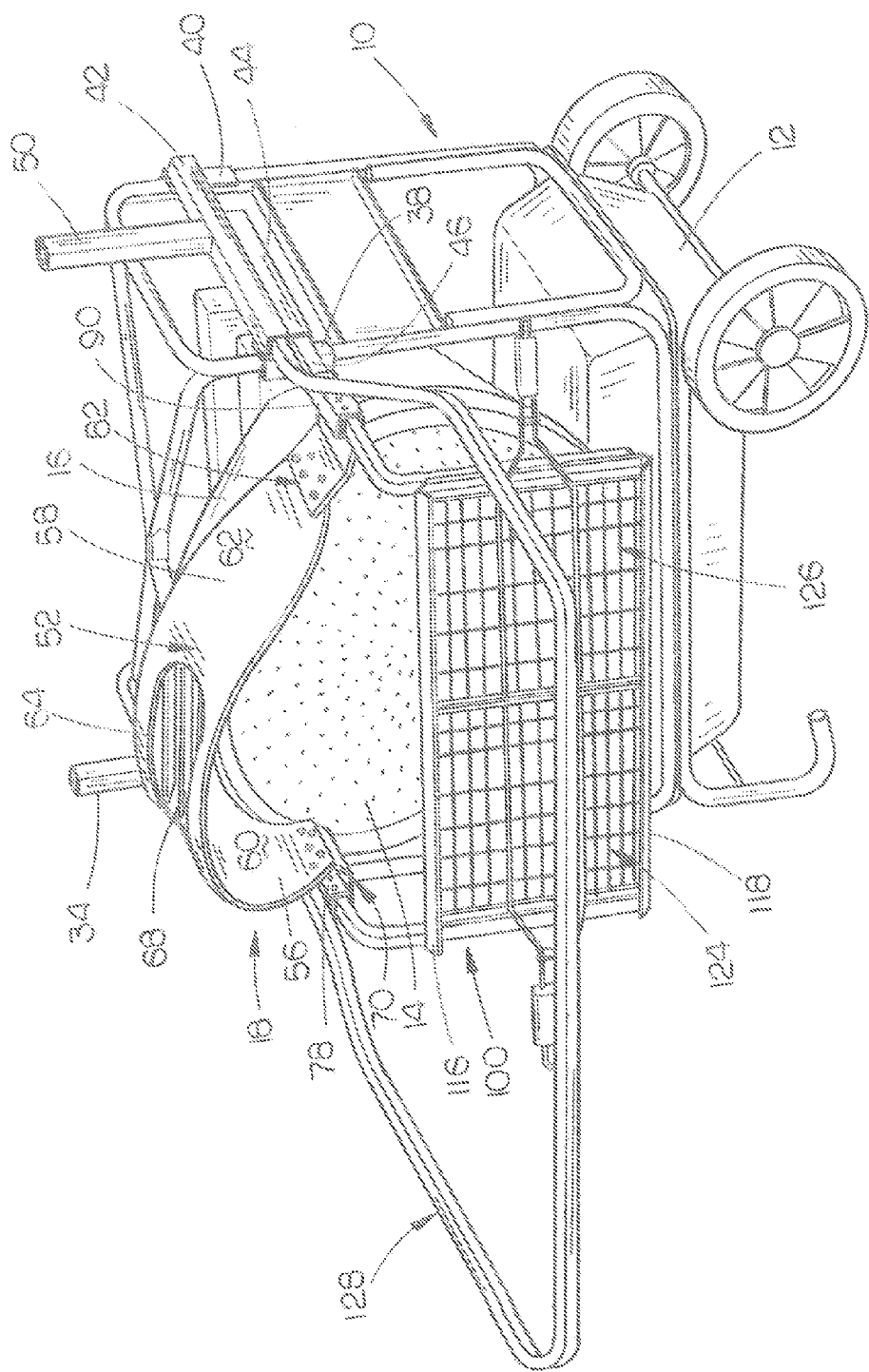
FIG. 1 is a perspective view of an infrared heater having various accessories selectively secured thereto.
Figure 2:
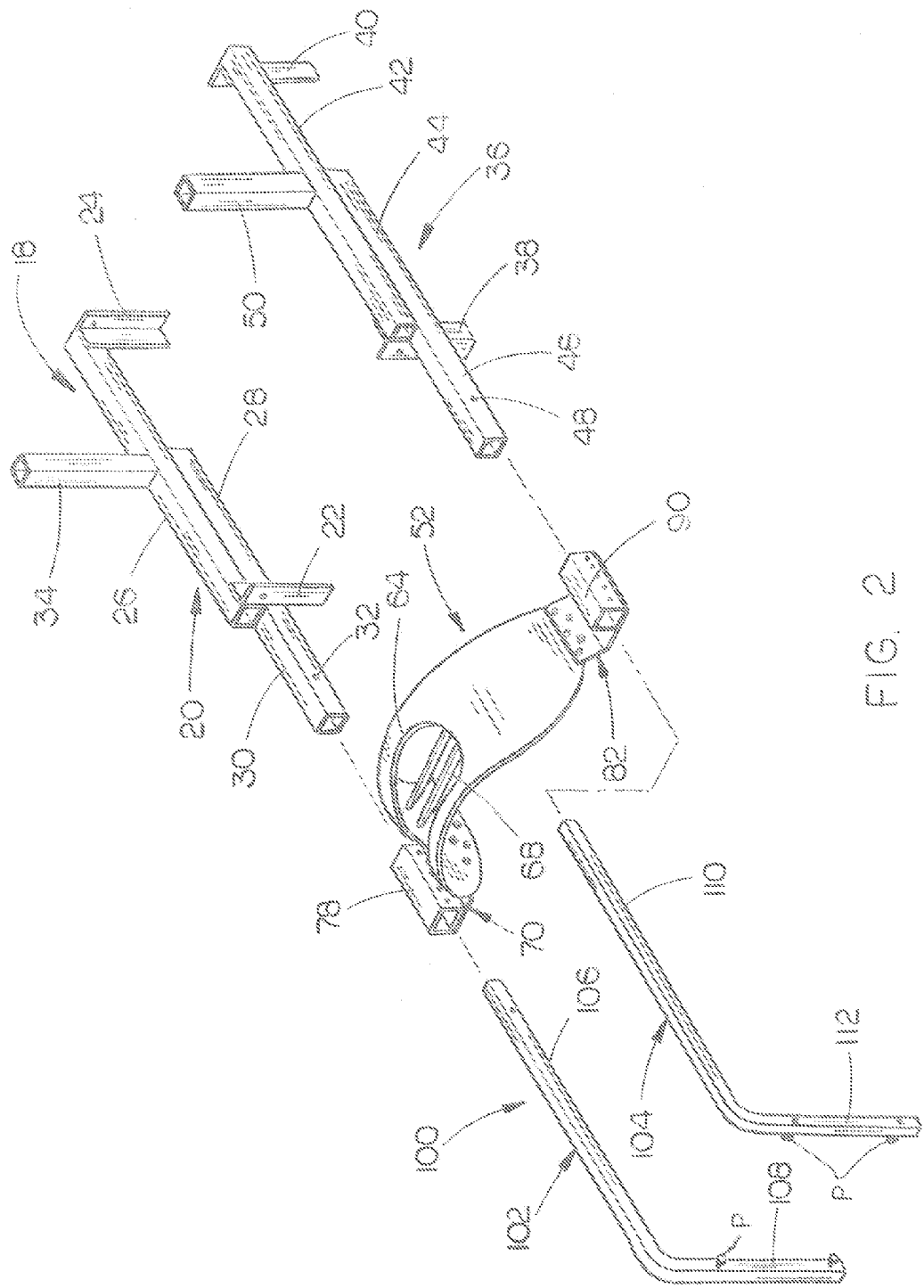
FIG. 2 is an exploded perspective view of the mounting brackets, deflector and cooking basket support structure.
Figure 3:
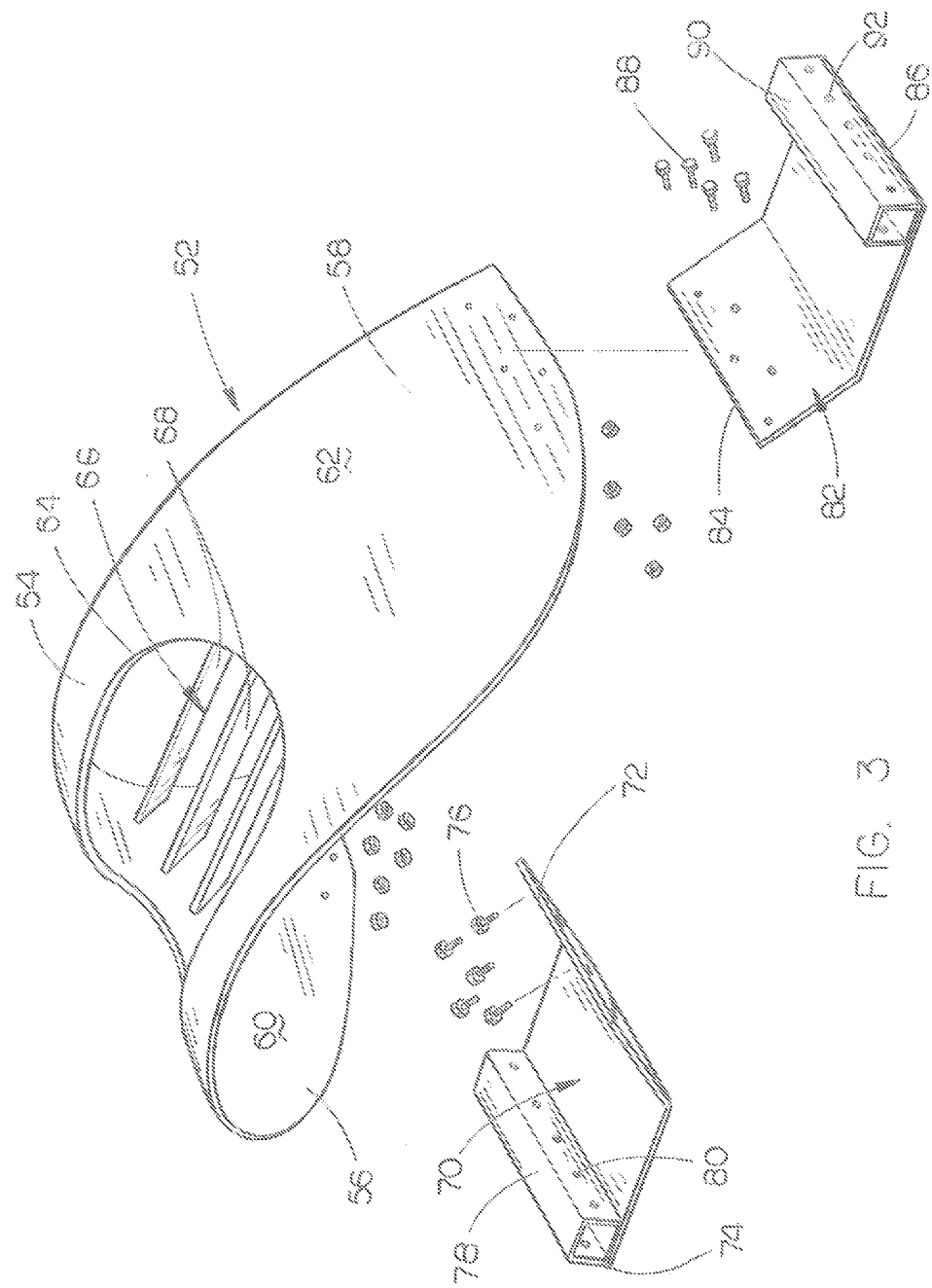
FIG. 3 is an exploded perspective view of the deflector of this invention.
Figure 4:
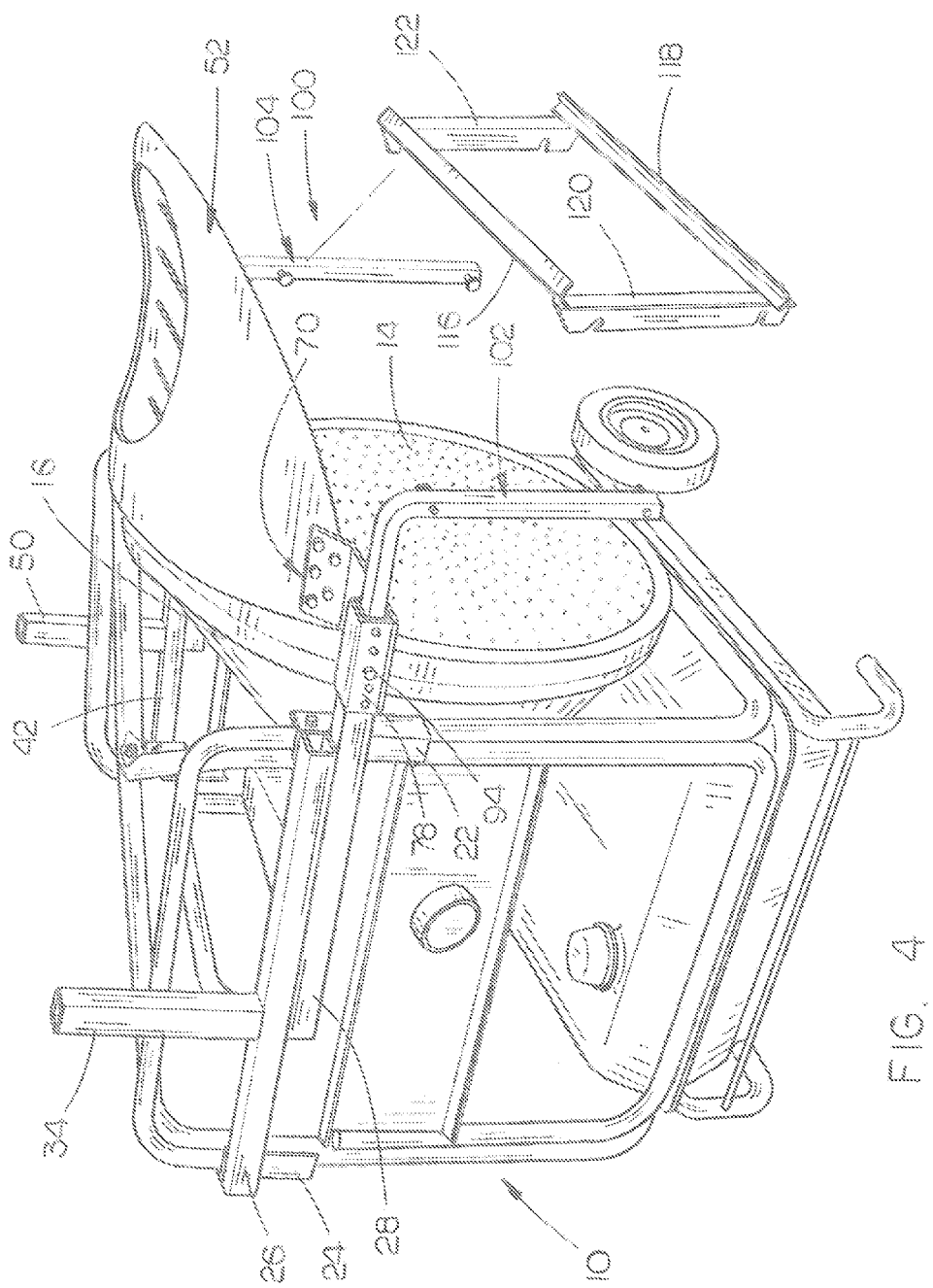
FIG. 4 is a perspective view of an infrared heater which illustrates various components or accessories associated therewith.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The numeral 10 refers to an infrared heater such as the Val6 Series heater manufactured and sold by Shizouka Seika Co., Ltd., having an address of 4-1 Yamana, Fukuroi-shi, Shizouka-ken, Japan 437-8601. The infrared heater 10 is diesel-fuel-fired and is mounted on a wheeled frame 12. Heater 10 includes a radiation disk 14 which emits infrared rays therefrom in conventional fashion. Disk 14 is mounted on the discharge end of a heating cone 16.

The apparatus of this invention is generally designated by the reference numeral 18. A mounting bracket 20 is secured to one side of the frame 12. Mounting bracket 20 includes a front angle bracket 22 which is secured to frame 12 and a rear angle bracket 24 which is secured to frame 12 rearwardly of front angle bracket 22. An elongated tubular member 26 is secured to angle brackets 22 and 24 and extends therebetween. An elongated tubular member 28 is secured to angle bracket 22 and tubular member 26 below tubular member 26. As seen, the forward end of tubular member 28 extends outwardly (forwardly) beyond the forward end of tubular member 26 to provide a forward end portion 30. Forward end portion 30 is provided with at least one pin or bolt opening 32 formed therein. A vertically disposed tubular member 34 is secured to tubular member 26 and extends upwardly therefrom.

A mounting bracket 36 is secured to the other side of the frame 12. Mounting bracket 36 includes a front angle bracket 38 which is secured to frame 12 and a rear angle bracket 40 which is secured to frame 12 rearwardly of front angle bracket 38. An elongated tubular member 42 is secured to angle brackets 38 and 40 and extends therebetween. An elongated tubular member 44 is secured to angle bracket 38 and tubular member 42 below tubular member 42. As seen, the forward end of tubular member 44 extends outwardly (forwardly) beyond the forward end of tubular member 42 to provide a forward end portion 46. Forward end portion 46 is provided with at least one pin or bolt opening 48 formed therein. A vertically disposed tubular member 50 is secured to the tubular member 42 and extends upwardly therefrom.

The numeral 52 refers to a downwardly curved metal visor or visor-like deflector. Deflector 54 includes a central portion 54 and side portions 56 and 58. Deflector 52 has an inner surface 60 and an outer surface 62.

A cooking utensil opening 64 is formed in deflector 52. Deflector 52 also includes a cooking utensil support 66 which is comprised of a plurality of elongated, spaced-apart support grid members or vanes 68. The opposite ends of the vanes 68 are welded to the inner surfaces of side portions 56 and 58 and extend therebetween below opening 64. As seen in the drawings, the vanes 68 are disposed at an angle so that the infrared rays passing through deflector 52 will be deflected upwardly and outwardly by the vanes 68 onto a cooking utensil such as a pot or kettle which is positioned in the opening 64 and supported on the vanes 68.

The numeral 70 refers to a bracket 70 having an inner end 72 and an outer end 74. The inner end 72 of bracket 70 is secured to side portion 56 of deflector 52 by bolts or screws 76. A horizontally disposed, hollow tube 78 is secured to the upper surface of bracket 70 at the outer end thereof. Tube 78 has a plurality of spaced-apart pin or bolt openings 80 extending horizontally therethrough. The numeral 82 refers to a bracket having an inner end 84 and an outer end 86. The inner end 84 of bracket 82 is secured to side portion 58 of deflector 52 by bolts or screws 88. A horizontally disposed hollow tube 90 is secured to the upper surface of bracket 82 at the outer end thereof. Tube 90 has a plurality of spaced-apart pin or bolt openings 92 extending horizontally therethrough.

Deflector 52 is selectively removably mounted on the heater 10 by slidably slipping the tubes 78 and 90 onto the forward end portions 30 and 46 of tubular members 28 and 44 respectively. A pin or bolt 94 is then inserted into one of the selected openings 80 and into opening 32 and a pin or bolt 96 is then inserted into one of the openings 92 and into opening 48. The deflector 52 may be selectively horizontally adjusted with respect to the radiation disk 14.

The structure for mounting the deflector 52 to the heater also enables a wire grill basket supporting structure 100 to be operatively mounted on the heater 10. The structure 100 includes horizontally spaced-apart frame members 102 and 104. Frame member 102 includes a horizontally disposed frame portion 106 and a vertically disposed frame portion 108. Frame member 104 includes a horizontally disposed frame portion 110 and a vertically disposed frame portion 112. Structure 104 also includes an elongated and horizontally disposed support member 116, having an inverted V-shaped cross-section and an elongated horizontally disposed support member 118 having an inverted V-shaped cross-section.

Structure 104 also includes an elongated and horizontally disposed support member 118, which has an inverted V-shaped cross-section, which is secured to frame portions 108 and 112 and which extends therebetween. Support members 116 and 118 are secured to brackets 120 and 122 and extend therebetween. Support members 116 and 118 are selectively attached to the pins P on frame portions 108 and 112.

Baskets 124 and 126, as shown in the co-pending applications, may then be mounted on the heater 10 by inserting the frame portions 106 and 110 into the forward ends of forward end portions 30 and 46.

If a protective grill 128 is used, the end portions thereof may be selectively slidably received in the open forward ends of the tubular members 26 and 42 respectively. When it is desired to store the protective grill 128, the end portions thereof may be inserted downwardly into the vertically disposed tubular members 34 and 50.

Thus it can be seen that a novel invention has been provided which includes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. A mounting bracket assembly for mounting various accessories on a portable infrared heater having a wheeled frame, and a discharge end having a radiation disk, with upper and lower ends, at the discharge end thereof which directs infrared rays outwardly therefrom, comprising:

a first elongated, generally horizontally disposed hollow tubular member having first and second ends, and upper and lower sides;

said first tubular member being secured to the wheeled frame;

a second elongated, generally horizontally disposed hollow tubular member having first and second ends and upper and lower sides;

said second tubular member being positioned below said first tubular member and operatively secured thereto;

said second end of said second tubular member being positioned outwardly of said second end of said first tubular member, a third elongated, generally horizontally disposed hollow tubular member having first and second ends and upper and lower sides;

said third tubular member being secured to the wheeled frame;

a fourth elongated, generally horizontally disposed hollow tubular member having first and second ends and upper and lower sides;

said fourth tubular member being positioned below said third tubular member and operatively secured thereto;

said second end of said fourth tubular member being positioned outwardly of said second end of said third tubular member;

a downwardly curved visor-like deflector having an outer end, an inner end, a first end and a second end;

a first horizontally disposed hollow tubular sleeve secured to said first end of said deflector;

a second horizontally disposed hollow tubular sleeve secured to said second end of said deflector;

said first and second tubular sleeves selectively slidably embracing said second ends of said second and fourth tubular members respectively to position said deflector outwardly of the upper end of said radiation disk;

said deflector including structure for supporting a cooking utensil thereon.

2. The mounting bracket assembly of claim 1 wherein said first and second tubular sleeves are selectively horizontally adjustable with respect to said second ends of said second and fourth tubular members respectively.

3. The mounting bracket assembly of claim 1 further including a protective grill having horizontally disposed first and second end portions, said first and second end portions of said protective grill being selectively slidably received by said second ends of said first and third tubular members respectively.

4. The mounting bracket structure of claim 3 wherein first and second vertically disposed tubular members extend upwardly from said first and third tubular members respectively and wherein said first and second end portions of said protective grill may be selectively slidably received by said first and second vertically disposed tubular members respectively.

5. The mounting bracket of claim 1 further including a cooking basket structure, having first and second horizontally disposed frame portions, which is selectively secured to said second and fourth tubular members by slidably extending said first and second frame portions of said cooking basket structure into said second ends of said second and fourth tubular members.

6. A mounting bracket assembly for mounting various accessories on a portable infrared heater having a frame, and a discharge end having a radiation disk, with upper and lower ends, at the discharge end thereof which directs infrared rays outwardly therefrom, comprising:

a first elongated, generally horizontally disposed hollow tubular member having first and second ends, and upper and lower sides;

said first tubular member being secured to the frame;

a second elongated, generally horizontally disposed hollow tubular member having first and second ends and upper and lower sides;

said second tubular member being positioned below said first tubular member and operatively secured thereto;

said second end of said second tubular member being positioned outwardly of said second end of said first tubular member;

a third elongated, generally horizontally disposed hollow tubular member having first and second ends and upper and lower sides;

said third tubular member being secured to the frame;

a fourth elongated, generally horizontally disposed hollow tubular member having first and second ends and upper and lower sides;

said fourth tubular member being positioned below said third tubular member and operatively secured thereto;

said second end of said fourth tubular member being positioned outwardly of said second end of said third tubular member;

a downwardly curved visor-like deflector having an outer end, an inner end, a first end and a second end;

a first horizontally disposed hollow tubular sleeve secured to said first end of said deflector;

a second horizontally disposed hollow tubular sleeve secured to said second end of said deflector;

said first and second tubular sleeves selectively slidably embracing said second ends of said second and fourth tubular members respectively to position said deflector outwardly of the upper end of said radiation disk;

said deflector including structure for supporting a cooking utensil thereon.

7. The mounting bracket assembly of claim 6 wherein said first and second tubular sleeves are selectively horizontally adjustable with respect to said second ends of said second and fourth tubular members respectively.

8. The mounting bracket assembly of claim 6 further including a protective grill having horizontally disposed first and second end portions, said first and second end portions of said protective grill being selectively slidably received by said second ends of said first and third tubular members respectively.

9. The mounting bracket structure of claim 8 wherein first and second vertically disposed tubular members extend upwardly from said first and third tubular members respectively and wherein said first and second end portions of said protective grill may be selectively slidably received by said first and second vertically disposed tubular members respectively.

10. The mounting bracket of claim 6 further including a cooking basket structure, having first and second horizontally disposed frame portions, which is selectively secured to said second and fourth tubular members by slidably extending said first and second frame portions of said cooking basket structure into said second ends of said second and fourth tubular members.

* * * * *